(12) United States Patent
Ramfjord (10) Patent No.: US 11,148,215 B2
(45) Date of Patent: Oct. 19, 2021

(54) MAGAZINE WIRE SAW

(71) Applicant: 1DIAMOND AS, Gjøvik (NO)

(72) Inventor: Harald Ramfjord, Deer Park, TX (US)

(73) Assignee: 1DIAMOND AS, Gjøvik (NO)

( * ) Notice: Subject to any disclaimer, the term of this patent is extended or adjusted under 35 U.S.C. 154(b) by 43 days.

(21) Appl. No.: 16/324,330

(22) PCT Filed: Aug. 9, 2017

(86) PCT No.: PCT/IB2017/054854
§ 371 (c)(1),
(2) Date: Feb. 8, 2019

(87) PCT Pub. No.: WO2018/029607
PCT Pub. Date: Feb. 15, 2018

(65) Prior Publication Data
US 2019/0176252 A1 Jun. 13, 2019

(30) Foreign Application Priority Data
Aug. 12, 2016 (NO) .................................. 20161298

(51) Int. Cl.
*B23D 57/00* (2006.01)
*B23D 61/18* (2006.01)
(52) U.S. Cl.
CPC ...... *B23D 57/0084* (2013.01); *B23D 57/0007* (2013.01); *B23D 57/0069* (2013.01); *B23D 61/18* (2013.01)
(58) Field of Classification Search
CPC ............ B23D 57/0084; B23D 57/0007; B23D 57/003; B23D 57/0038; B23D 57/0046;
(Continued)

(56) References Cited

U.S. PATENT DOCUMENTS 4,494,523 A * 1/1985 Wells .................... B28D 5/045
125/16.01
4,633,848 A * 1/1987 Bresciani ............... B23Q 27/00
125/10
(Continued)

FOREIGN PATENT DOCUMENTS

FR 2734192 A1 11/1996
GB 2516296 A * 1/2015
(Continued)

OTHER PUBLICATIONS

International Patent Application No. PCT/IB2017/054854, International Search Report and Written Opinion dated Oct. 30, 2017 (10 pages).

(Continued)

*Primary Examiner* — Evan H MacFarlane
(74) *Attorney, Agent, or Firm* — Conley Rose, P.C.

(57) ABSTRACT

A wire saw includes a U-shaped cutting area. An endless sawing wire loop runs between a plurality of wire pulleys including at least two displaceable cutting area pulleys, displaceable wire tensioning pulleys and wire plane changing pulleys. The endless wire loop defines a first cutting area plane P1 in the U-shaped cutting area and at least one further wire loop plane dissimilar from the first cutting area plane. The wire plane changing pulleys guide the sawing wire between the first cutting area plane and the further wire loop plane P2. A wire driving pulley is driven by a wire drive motor. A cutting area pulley actuator runs the cutting area pulleys along each side of the workpiece cutting area. The displaceable wire tensioning pulleys are displaceable by at least one tensioning actuator within the further wire loop plane P2 to maintain a tensioned sawing wire.

10 Claims, 7 Drawing Sheets

(58) Field of Classification Search
CPC ............ B23D 57/0061; B23D 57/0053; B23D 57/0069; B23D 61/18; B23D 61/185; E02B 17/00; E02B 17/0034; E02B 2017/0052; E02B 2017/0056–0086; E21B 29/12; E02D 9/04; Y10T 83/667; Y10T 83/68; Y10T 83/7507; Y10T 83/9292
See application file for complete search history.

(56) References Cited

U.S. PATENT DOCUMENTS

| | | | | |
|---|---|---|---|---|
| 4,765,307 | A * | 8/1988 | Kubo | B23D 57/0053 125/12 |
| 5,060,628 | A * | 10/1991 | Ishida | B23D 57/0053 125/21 |
| 5,361,748 | A * | 11/1994 | Matteucci | B23D 53/003 125/21 |
| 5,645,040 | A | 7/1997 | Bieri Jun | |
| 5,875,771 | A * | 3/1999 | Plattner | B23D 57/0053 125/12 |
| 9,457,490 | B2 * | 10/2016 | Oberg | B23D 57/0038 |
| 2001/0029939 | A1 * | 10/2001 | Mazaki | B23D 57/0053 125/21 |
| 2009/0266552 | A1 | 10/2009 | Barra et al. | |
| 2010/0186564 | A1 | 7/2010 | Pierce | |
| 2011/0192389 | A1 * | 8/2011 | Jang | B23D 57/0084 125/21 |
| 2012/0174723 | A1 * | 7/2012 | Matteucci | B23D 57/0007 83/794 |
| 2014/0109740 | A1 | 4/2014 | Shae et al. | |
| 2014/0157964 | A1 | 6/2014 | Davis et al. | |
| 2015/0027287 | A1 | 1/2015 | Harper et al. | |
| 2015/0290727 | A1 * | 10/2015 | Matteucci | B23D 57/0084 83/13 |
| 2016/0035443 | A1 * | 2/2016 | Park | B23D 53/001 376/260 |

FOREIGN PATENT DOCUMENTS

| | | |
|---|---|---|
| JP | H05 141106 A | 6/1993 |
| WO | 2017/007946 A1 | 1/2017 |

OTHER PUBLICATIONS

International Patent Application No. PCT/IB2017/054854, International Preliminary Report on Patentability dated Nov. 15, 2018 (16 pages).

Norwegian Patent Application No. 20161298 Norwegian Search Report dated Feb. 22, 2017 (2 pages).

* cited by examiner

MAGAZINE WIRE SAW

CROSS-REFERENCE TO RELATED APPLICATIONS

This application is a National Phase entry of, and claims priority to PCT Application No. PCT/IB2017/054854, filed Aug. 9, 2017, entitled "Magazine Wire Saw," which claims benefit of Norwegian Patent Application No. NO20161298, filed Aug. 12, 2016, entitled "Magazine Wire Saw," the entire contents of each being hereby incorporated herein by reference in their entirety for all purposes.

STATEMENT REGARDING FEDERALLY SPONSORED RESEARCH OR DEVELOPMENT

Not applicable

The present disclosure relates to a wire saw with a sawing wire magazine.

BACKGROUND

Typical wire saws for subsea use include a wire loop running in a plane between pulleys running on a frame. The plane of the entire wire loop is the same as the plane of the sawing or cutting plane and the frame has an area that is at least twice as big as the plane of the object to be cut. The size of the frame must also be sufficient to provide a tensioned wire length with adequate amount of abrasive material/cutting synthetic diamonds to perform the cut. The result is a saw with a rather large footprint when used on a seabed.

The wire saw design may have fixed outer dimensions allowing the saw to be installed in a cabinet without requiring impractically large outer dimensions. A cabinet may provide better operational conditions for parts of the wire saw as internal components may be less exposed to debris and mud from the seabed and the cutting process.

SUMMARY OF THE DISCLOSURE

The wire saw disclosed herein is particularly developed to cut subsea structures below the level of a seabed. Subsea structures include conductors and platform legs and cutting is typically done down to 1000 ft (300 m).

It is a purpose to provide a saw with a small footprint on the seabed to reduce the required amount of dredging. Dredging the seabed is time consuming and cost intensive. Furthermore, it is a purpose of the disclosure to provide a wire saw that may be operated without diver intervention. Avoiding diver intervention dramatically improves HSE. Furthermore, it is a purpose of the present disclosure to provide a wire saw where the wire loop length does not completely dictate the outer dimensions of the saw.

Accordingly, embodiments disclosed herein relate to a wire saw with a cutting portion with a U-shaped cutting area and cutting area sides. In certain embodiments, an endless sawing wire loop runs between a plurality of wire pulleys including at least two along each side of the U-shaped cutting area displaceable pulleys, at least one displaceable wire tensioning pulley and at least one wire plane changing pulley. The endless wire loop may define a first cutting area plane P1 in the U-shaped cutting area and at least one further wire loop plane dissimilar from the first cutting area plane. The at least one wire plane changing pulley may be employed to guide the sawing wire between the first cutting area plane and the at least one further wire loop plane P2. At least one of said plurality of wire pulleys may be a wire driving pulley in driving relationship with at least one wire drive motor. At least one cutting area pulley actuator may be provided to run or linearly shift the cutting area pulleys along each side of the workpiece cutting area. The at least one displaceable wire tensioning pulley may be displaceable by at least one tensioning actuator within the at least one further wire loop plane P2 to maintain a tensioned sawing wire.

The at least one cutting area pulley at each side of the workpiece cutting area may include an axis of rotation substantially perpendicular to, or with a small angle off perpendicular to the cutting area cutting plane P1.

The wire saw may further include a sawing wire magazine frame and the at least one displaceable wire tensioning pulley may be supported by said at least one tensioning actuator displaceable tensioning frame and in the at least one further wire loop plane.

The plurality of wire pulleys may further include at least one wire loop accommodation pulley located in the at least one further wire loop plane.

The at least one wire loop accommodation pulley may be supported in the sawing wire magazine frame.

Two wire loop accommodation pulleys and two wire driving pulleys may be in driving relationship with two wire drive motors supported in the sawing wire magazine frame. Three displaceable wire-tensioning pulleys may be supported in the displaceable tensioning frame.

The sawing wire magazine frame may be perpendicular to the cutting portion, and the first cutting area plane in the U-shaped cutting area may be perpendicular to the at least one further wire loop plane.

A magazine frame cabinet may enclose the sawing wire magazine frame.

The cutting area pulleys will normally be inclined in relation to the first cutting area plane P1 to rotate to sawing wire around its longitudinal axis.

A length of the workpiece cutting area lc may be greater than half a total length of the wire saw lt in a plane P1 of the cutting area and in a direction perpendicular to a cutting portion of the cutting wire whereby the wire saw retains a small and fixed footprint during operation.

The outer dimensions of the wire saw may remain constant throughout a cutting operation.

The at least one displaceable wire tensioning pulley may be displaceable in a direction Dt parallel to a plane P3 parallel to a direction of travel Dr of the two displaceable pulleys and perpendicular to the cutting area plane P1.

DETAILED DESCRIPTION OF DISCLOSED EXEMPLARY EMBODIMENTS

Figure 1:
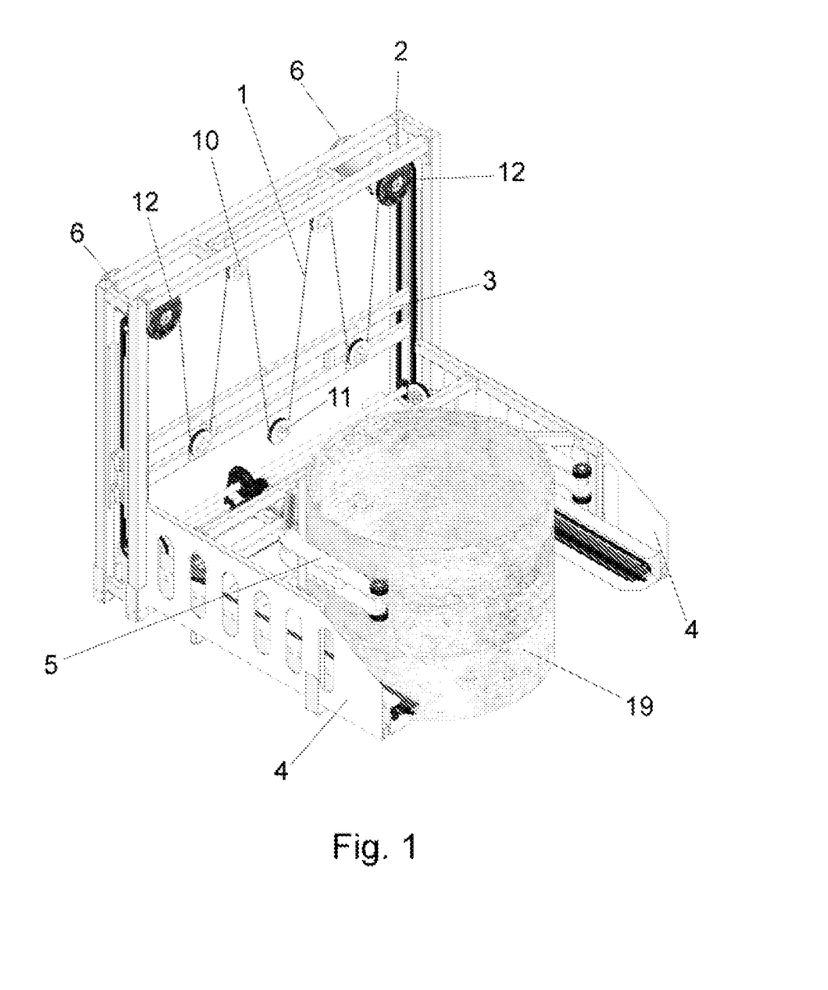
FIG. 1 is a perspective view of a wire saw made in accordance with this disclosure.

FIG. 1 is a perspective view of an exemplary embodiment of a wire saw with a sawing portion of a sawing wire 1 in an initial completely retracted position. This is the position of the sawing wire before the wire saw start cutting. The wire saw includes a sawing wire magazine with a magazine frame 2 defining a magazine frame plane perpendicular to or orthogonal with a fork shaped runner frame 4 defining a sawing plane. A tensioning frame 3 is movable inside the magazine frame 2 along a plane parallel to or coinciding with the magazine frame plane. The tensioning frame is shown in a lower position. The tensioning frame 3 moves in the magazine frame plane and in a direction parallel to a plane parallel to runners for two cutting gap saw wire pulleys and perpendicular to the sawing plane. Two wire drive motors 6 with drive pulleys 12 are fixed to an upper part of the magazine frame 2 along with two magazine frame pulleys 10. Three tensioning frame pulleys 11 are fixed to the tensioning frame 3. The tensioning frame and the magazine frame pulleys 10, 11 and the drive pulleys 12 rotate in a plane parallel to or coinciding with the magazine frame plane. The tensioning frame and magazine frame pulleys 10, 11 and the drive pulleys 12 also serve as accommodation pulleys to accommodate a wire of sufficient length. The number of pulleys may be increased or decreased depending on the required length of the sawing wire, constraints relating to outer dimensions of the saw and concerns relating to the force imposed on the structure. The sawing wire 1 extends between the tensioning frame and magazine frame pulleys 10, 11 and the drive pulleys 12 in a zigzag pattern. The two cutting gap saw wire pulleys are in a retracted position in the fork shaped runner frame 4 and are not visible. A workpiece 19 is located between runners of the fork shaped runner frame 4.

Figure 2:
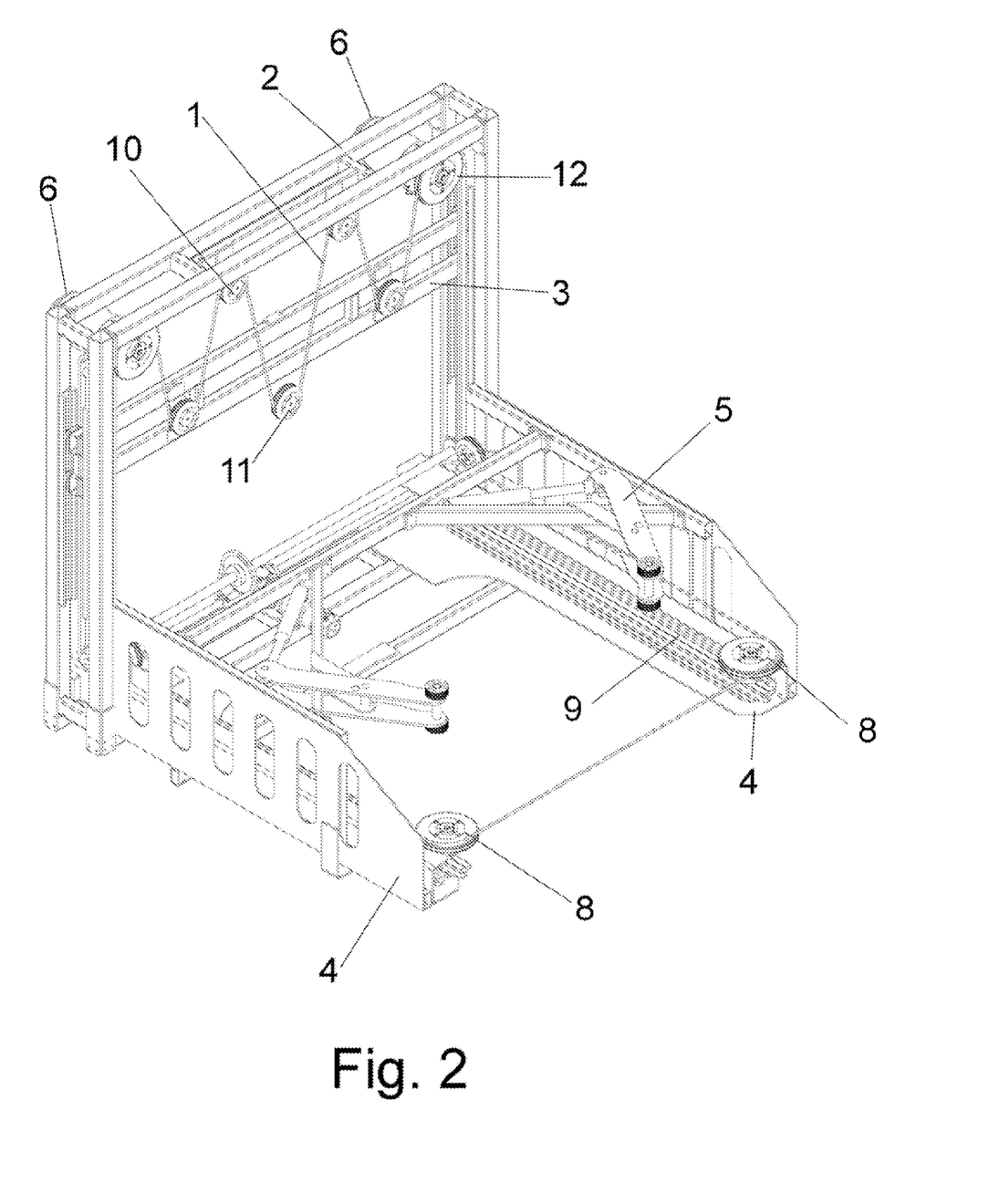
FIG. 2 corresponds to FIG. 1, but shows a sawing portion of a sawing wire in a final completely extended position after a cut through a workpiece is completed.
Figure 3:
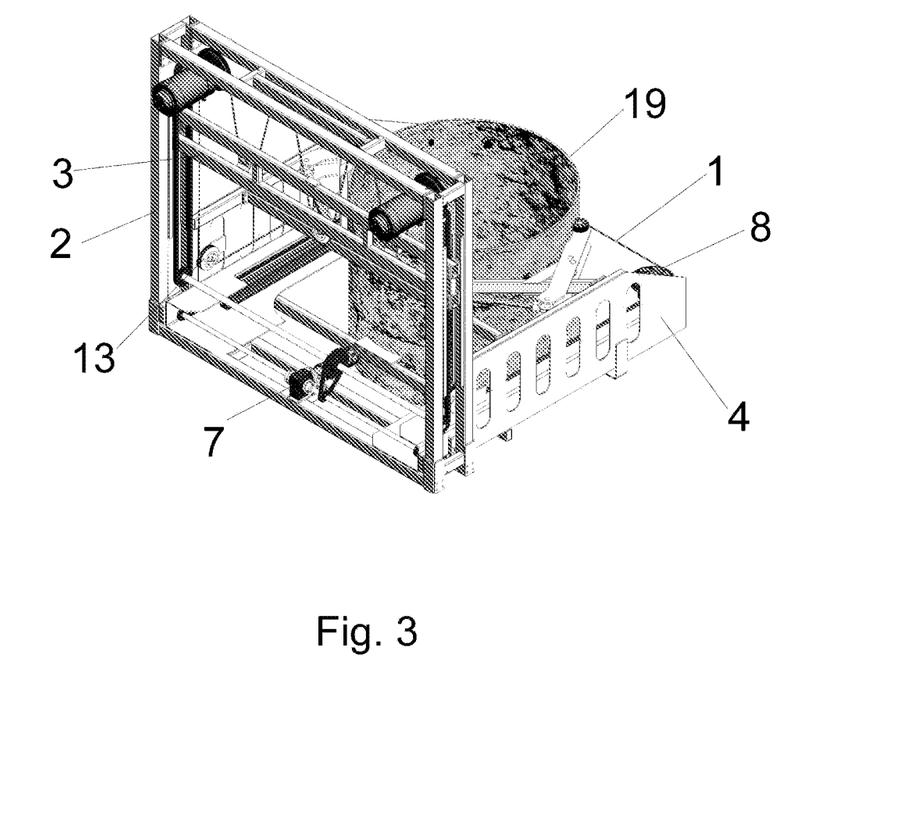
FIG. 3 is a perspective view from the rear of the wire saw of FIGS. 1 and 2.

FIG. 2 corresponds to FIG. 1, but FIG. 2 shows the sawing portion of the sawing wire 1 in a final completely extended position after a cut through the workpiece is completed. Workpiece clamps 5 are in a forward position for holding the wire saw to a workpiece (as shown in FIGS. 1 and 3). The cutting gap pulleys 8 are movable along the sawing plane and are shown in an extended position along the fork shaped runner frame 4. Cutting gap pulley linear actuators 9 with runner tracks move each cutting gap pulley 8 individually along the fork runner frame 4. FIG. 2 shows the tensioning frame 3 with the tensioning frame pulleys 11 in an upper position in the magazine frame 2 with the magazine frame pulleys 10. The wire drive motors 6 supports the drive pulleys 12.

FIG. 3 shows the wire saw of FIGS. 1 and 2 in a perspective view from the rear. The sawing wire 1 and the tensioning frame 3 are in the same position as in FIG. 2. A tensioning frame actuator 7 drives the tensioning frame up or down inside the magazine frame 2. One corner pulley 13 in each corner between the magazine frame 2 and the fork runner frame 4 allows the sawing wire 1 to move in a sawing plane that is perpendicular to or close to perpendicular to the sawing wire magazine plane. Tracks in the magazine frame 2 and runners on the tensioning frame 3 enables the tensioning frame 3 to shift between the upper and lower position in the magazine frame upon actuation by the actuator 7.

Figure 4:
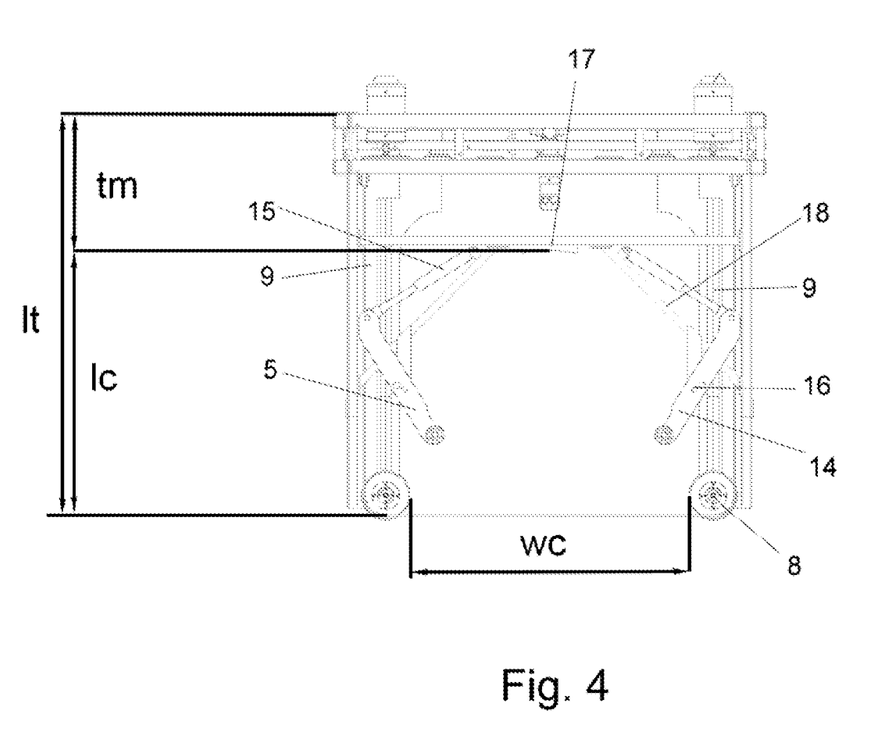
FIG. 4 shows the embodiment of the FIGS. 1-4 from above.

FIG. 4 shows the embodiment of the FIGS. 1-4 from above. The sawing wire and the workpiece clamp 5 are in the same forward position as on FIGS. 2 and 3. The sawing portion of the sawing wire 1 and the cutting gap pulleys 8 are in a forward position along the cutting gap pulley linear actuators 9. The workpiece clamp 5 include two pivoted clamp arms 14 pivoted in clamp arm pivot joints 16 and actuated by two clamp arm actuators 15. The clamp arms 14 press a workpiece contact pad 17 and workpiece alignment elements 18 toward the tubular workpiece (not shown). The work piece alignment elements 18 also serves to fix one end of each clamp arm actuator 15. The cutting area linear actuators 9 include runner tracks. FIG. 4 also shows that the length of the workpiece cutting area lc is greater than half the total length of the wire saw lt. The magazine thickness tm is also less than the length of the workpiece cutting area lc. The width of the cutting area wc, approximately equals the length of the cutting area lc. The workpiece cutting area lc×wc can span over more than half the total footprint area.

Figure 5:
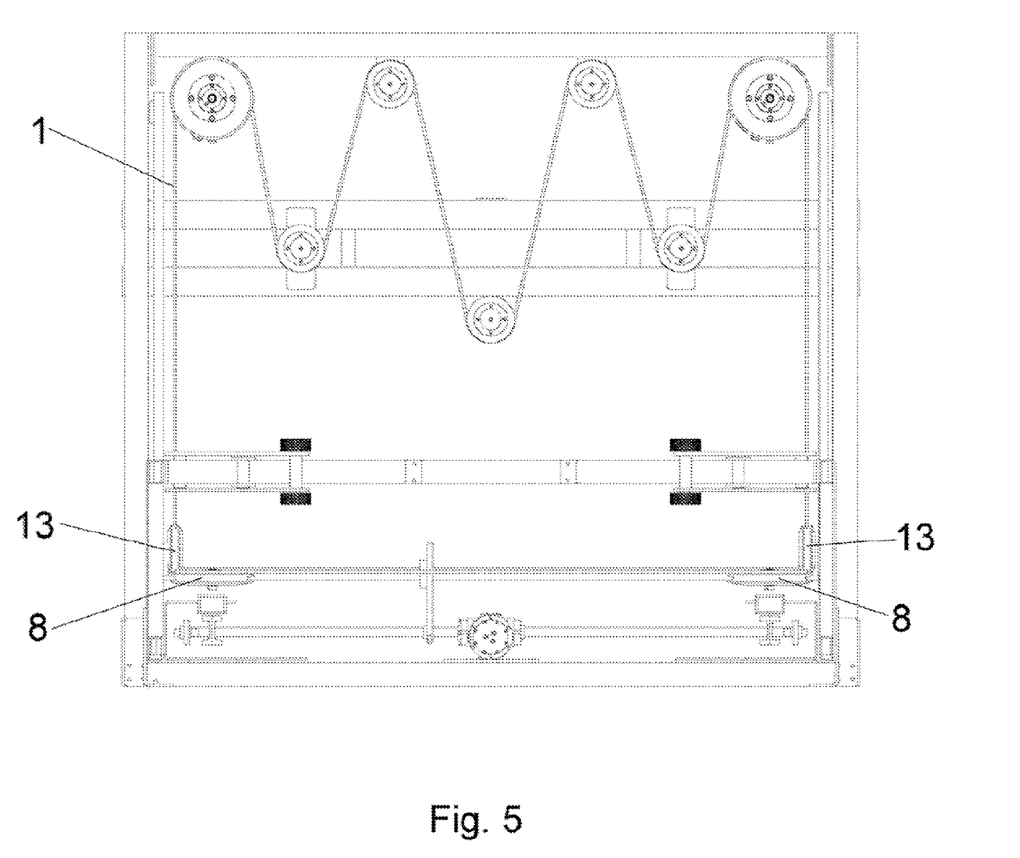
FIG. 5 is a view perpendicular to the view on FIG. 4.

FIG. 5 shows the embodiment of the FIGS. 1-4 from the front in a view perpendicular to the view on FIG. 4. The cutting gap pulleys 8 and the corner pulleys 13 are aligned with each other to ensure that the cutting wire enters the cutting gap pulleys at the right angle. The cutting gap pulleys 8 rotate in a plane that is slightly inclined in relation to the sawing plane to rotate the sawing wire 1 along its longitudinal axis during operation. The tensioning frame is close to its uppermost position.

Figure 6:
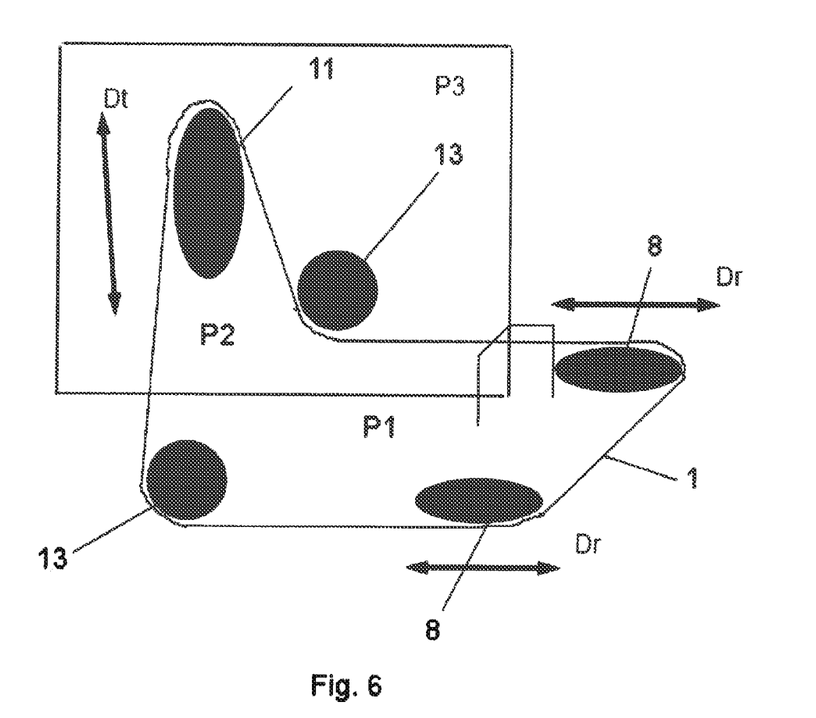
FIG. 6 is a schematic representation of a basic configuration of a wire saw made in accordance with this disclosure.

FIG. 6 is a schematic representation of a basic configuration of a wire saw made in accordance with this disclosure with a sawing wire 1 in an endless wire loop running in a first cutting area plane P1 in a U-shaped cutting area and at least one further wire loop plane P2 dissimilar from the first cutting area plane. Two wire plane-changing pulleys 13 guide the wire between the two cutting area planes P1, P2. Two along the sides of the U-shaped cutting area displaceable pulleys 8 are displaceable in the direction of the two horizontal arrows in the first cutting area plane P1. The displaceable wire tensioning pulley 11 is displaceable by at least one tensioning actuator in the direction of the substantially vertical arrow within the at least one further wire loop plane to maintain tension in the wire. FIG. 6 furthermore shows how the tensioning pulley 11 moves in a direction Dt parallel to a plane P3. The plane P3 is parallel to the direction of travel Dr of the two displaceable pulleys 8 and perpendicular to the cutting area plane P1.

Figure 7:
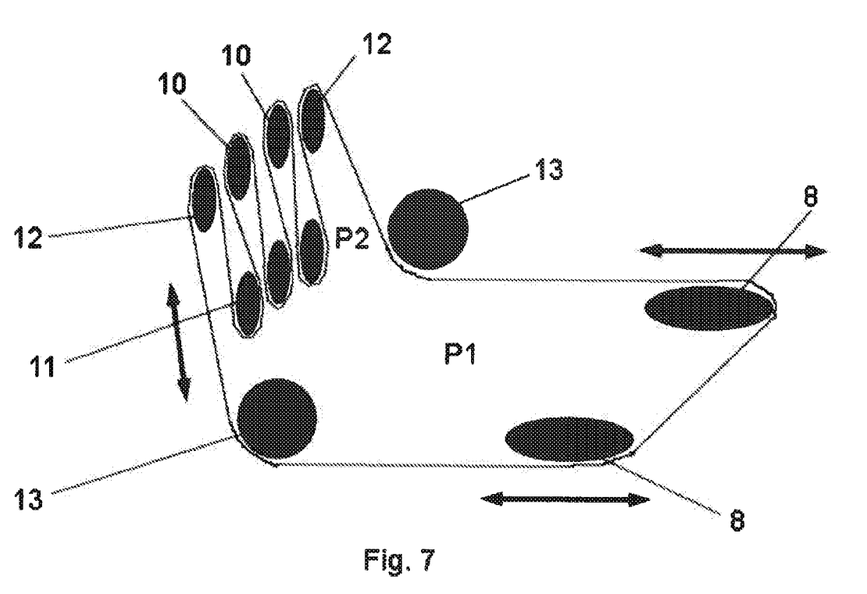
FIG. 7 is a schematic representation of the configuration the wire saw as shown in FIG. 1.

FIG. 7 is a schematic representation of a configuration of a wire saw that, similarly with the solution shown on FIG. 6, includes an endless wire loop running in a first cutting area plane P1 in a U-shaped cutting area and at least one further wire loop plane P2 dissimilar from the first cutting area plane. Two wire loop accommodation pulleys 10 (same as the tensioning frame pulleys) and two wire driving pulleys 12 in driving relationship with two wire drive motors are fixed. The two wire driving pulleys 12 also serves as accommodation pulleys to enable a sufficiently long wire. Three displaceable wire tensioning pulleys 11 are movable in a direction of the arrow to the left of the figure to maintain the wire in tension when the displaceable pulleys 8 are displaced in the direction of the two horizontal arrows in the first cutting area plane P1. Two wire plane changing pulleys 13 or corner pulleys enables the wire loop to run between the two planes P1, P2. Alternatively could the position of the accommodation pulleys 10 be movable and the position of the wire tensioning pulleys 11 be fixed.

Figure 8:
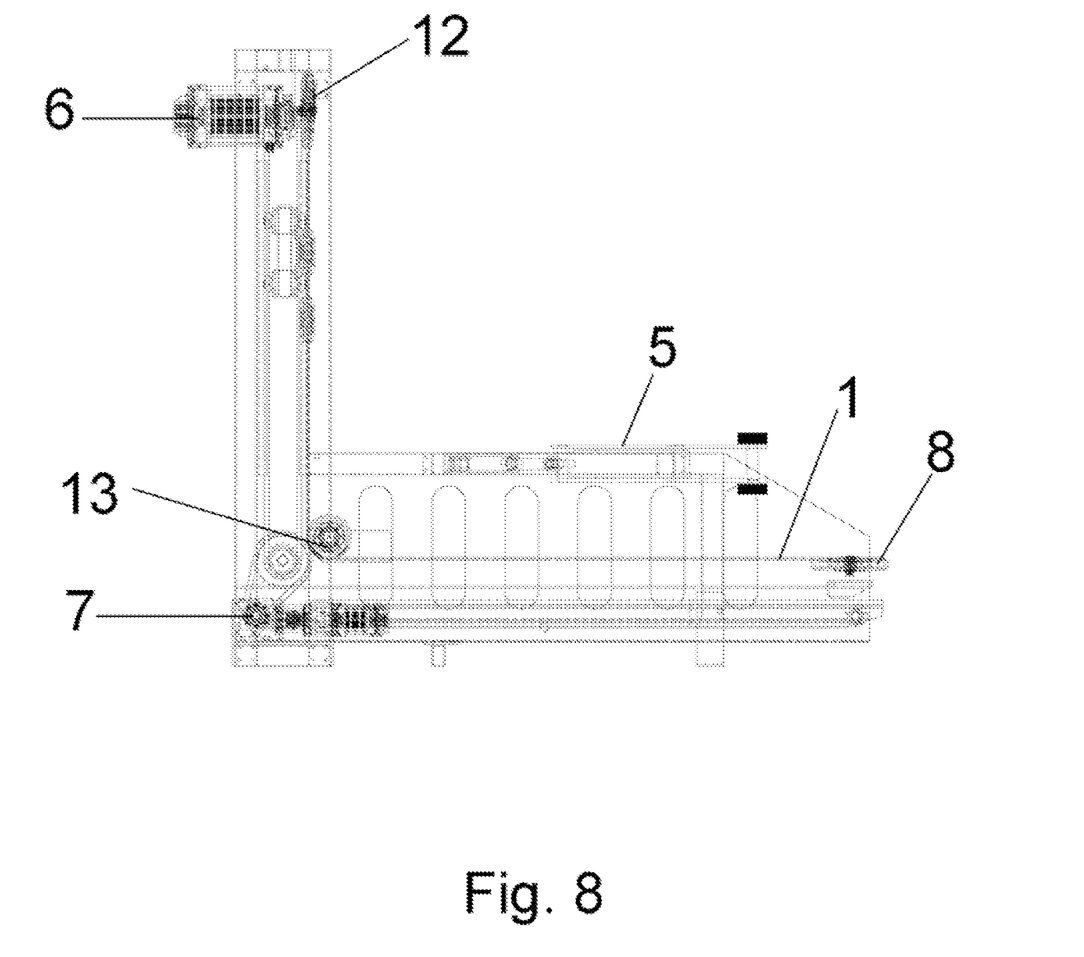
FIG. 8 is a partly cut through side elevation of the embodiment shown in the FIG. 1 to highlight the internal components.

FIG. 8 is a partly cut through side elevation of the embodiment described above and shown in the FIGS. 1-5.

The wire drive motors 6 supporting the wire drive pulleys 12 are located in the upper part of the magazine frame. The corner pulleys 13 guides the cutting wire 1 between the cutting area plane and the magazine or accommodation plane. These two planes are perpendicular to each other. The workpiece clamp 5 is provided above the cutting area plane and the cutting area pulleys 8. An actuator motor 7 drives the tensioning frame up and down to ensure that the sawing wire has the required tension.

In embodiments disclosed herein, the sawing wire tension may be monitored and the cutting gap pulley linear actuators, the wire drive motors, the tensioning frame actuator may be individually controllable and controlled to ensure correct sawing wire tension in all parts of the sawing wire and to prevent skidding of the wire on the drive pulleys and overloading the wire. The individual control of the sawing parameters is also useful in the event of wire jamming, and the twin wire drive motor set up also enables the sawing wire to be run in both directions without changing the overall load pattern and without overloading the tensioning pulleys. The control system of the wire saw typically monitors and controls sawing parameters such as sawing wire tension in several location, motor speed, motor torque, position of actuators, speed of pulleys, force on pulleys, force on actuators, motor temperature etc. The sawing could be controlled in real-time to prevent wire breakage in the event of wire jamming, prevent slippage on pulleys to prevent premature wear of pulleys, to alter sawing parameters to control sawing wire load etc. A topside operator typically controls the saw through an umbilical. The motors and actuators will normally be electric, but hydraulic actuators and/or motors can also be used.

The term "frame" is intended to cover structures able to form platforms for the various components and to maintain the required positions of the pulleys and other components.

The workpiece is typically a 70" (1778 mm) pipe, and the wire length is typically 19 m to provide a sufficient amount of abrasive/cutting material on the sawing wire. Sawing wires with abrasive or cutting material such as embedded synthetic diamonds are well known within the art.

| | |
|---|---|
| 1 | Sawing wire |
| 2 | Sawing wire magazine frame |
| 3 | Tensioning frame |
| 4 | Cutting portion |
| 5 | Workpiece clamp |
| 6 | Wire drive motors |
| 7 | Tensioning frame actuator |
| 8 | cutting area pulleys |
| 9 | cutting area linear actuators |
| 10 | accommodation/magazine frame pulleys |
| 11 | Tensioning frame tensioning pulleys |
| 12 | Drive pulleys |
| 13 | Corner pulleys |
| 14 | Clamp arms |
| 15 | Clamp arm actuators |
| 16 | Clamp arm pivot joint |
| 17 | Workpiece contact pad |
| 18 | Workpiece alignment element |
| 19 | Work piece |

The invention claimed is:

1. A wire saw, comprising:
   a runner frame including two runners that define a U-shaped cutting area, wherein the runners are spaced such that the U-shaped cutting area is configured to receive a workpiece in the U-shaped cutting area along a direction that is parallel to the runners;
   a clamp coupled to the runner frame, wherein the clamp comprises a contact pad and an arm configured to press the workpiece against the contact pad; and
   an endless sawing wire loop running between a plurality of wire pulleys;
   wherein the plurality of wire pulleys includes:
      at least two cutting area pulleys along each side of the U-shaped cutting area such that a first of the at least two cutting area pulleys is coupled to a first of the runners and a second of the at least two cutting area pulleys is coupled to a second of the runners;
      at least one displaceable wire tensioning pulley; and
      two wire plane changing pulleys; and
   wherein:
      the endless sawing wire loop defines a cutting area plane (P1) in the U-shaped cutting area and a wire loop plane (P2) dissimilar from the cutting area plane (P1);
      the runner frame extends within the cutting area plane (P1);
      the two wire plane changing pulleys are configured to guide the endless sawing wire loop between the cutting area plane (P1) and the wire loop plane (P2);
      the plurality of wire pulleys comprises at least one wire driving pulley in driving relationship with at least one wire drive motor;
      at least one pulley actuator is provided that is configured to move the at least two cutting area pulleys along the runners within the U-shaped cutting area;
      the at least one displaceable wire tensioning pulley is displaceable to maintain tension on the endless sawing wire loop;
      the at least one displaceable wire tensioning pulley is supported by a displaceable tensioning frame;
      the displaceable tensioning frame is configured to be displaced within a magazine frame by at least one tensioning actuator, along a magazine frame plane that is parallel to or coincides with the wire loop plane (P2);
      the magazine frame is stationarily fixed relative to the runner frame such that the magazine frame plane is perpendicular to the cutting area plane (P1);
      the plurality of wire pulleys further includes at least one wire loop accommodation pulley located in the wire loop plane (P2);
      the at least one wire loop accommodation pulley is supported in the magazine frame; and
      the endless sawing wire loop extends between the at least one displaceable wire tensioning pulley, the at least one accommodation pulley, and the at least one wire driving pulley in a zigzag pattern.

2. The wire saw of claim 1 wherein each of the at least two cutting area pulleys includes an axis of rotation perpendicular to the cutting area plane (P1).

3. The wire saw of claim 1 wherein a length (lc) of the U-shaped cutting area is greater than half a total length (lt) of the wire saw in the cutting area plane (P1), the total length (lt) being in a direction perpendicular to a cutting section of the endless sawing wire loop that extends between the runners, whereby the wire saw retains a fixed footprint during operation.

4. The wire saw of claim 1 wherein outer dimensions of the wire saw remain constant throughout a cutting operation.

5. The wire saw of claim 1 wherein the at least one displaceable wire tensioning pulley is displaceable in a direction (Dt), wherein the at least two cutting area pulleys are displaceable in a direction (Dr), wherein the direction (Dt) is parallel to a plane (P3), and wherein the plane (P3) is parallel to the direction (Dr) and perpendicular to the cutting area plane (P1).

6. The wire saw of claim 1, wherein the at least one wire loop accommodation pulley includes two wire loop accommodation pulleys, wherein the at least one wire driving pulley includes two wire driving pulleys, wherein the two wire loop accommodation pulleys and the two wire driving pulleys are supported in the magazine frame, and wherein the at least one displaceable wire tensioning pulley comprises three displaceable wire tensioning pulleys supported by the displaceable tensioning frame.

7. The wire saw of claim 6 wherein each of the at least two cutting area pulleys includes an axis of rotation perpendicular to the cutting area plane (P1).

8. The wire saw of claim 6 wherein a length (lc) of the U-shaped cutting area is greater than half a total length (lt) of the wire saw in the cutting area plane (P1), the total length (lt) being in a direction perpendicular to a cutting section of the endless sawing wire loop that extends between the runners, whereby the wire saw retains a fixed footprint during operation.

9. The wire saw of claim 6 wherein outer dimensions of the wire saw remain constant throughout a cutting operation.

10. The wire saw of claim 6 wherein the at least one displaceable wire tensioning pulley is displaceable in a direction (Dt), wherein the at least two cutting area pulleys are displaceable in a direction (Dr), wherein the direction (Dt) is parallel to a plane (P3), and wherein the plane (P3) is parallel to the direction (Dr) and perpendicular to the cutting area plane (P1).

* * * * *